(12) United States Patent
Siegfried et al.

(10) Patent No.: US 9,569,008 B1
(45) Date of Patent: Feb. 14, 2017

(54) SOLID STATE INPUT DEVICE

(71) Applicant: Logitech Europe S.A., Lausanne (CH)

(72) Inventors: Samuel Siegfried, Lausanne (CH); Jean-Claude Dunant, Echellens (CH); Baptiste Merminod, Dommartin (CH); Regis Croisonnier, St. Martin Bellevue (FR); Olivier Theytaz, Savigny (CH)

(73) Assignee: Logitech Europe S.A., Lausanne (CH)

( * ) Notice: Subject to any disclaimer, the term of this patent is extended or adjusted under 35 U.S.C. 154(b) by 0 days.

(21) Appl. No.: 14/840,877

(22) Filed: Aug. 31, 2015

(51) Int. Cl.
*G06F 3/02* (2006.01)

(52) U.S. Cl.
CPC .................... *G06F 3/0202* (2013.01)

(58) Field of Classification Search
CPC ...... G06F 3/04886; G06F 3/041; G06F 3/016; G06F 3/0414; G06F 3/0202; G06F 1/1684; G06F 2203/04102; G06F 3/03547; H03K 17/9622; H03K 17/9625; H03K 2017/9602; H03K 2217/960725
USPC ... 345/168, 173–175; 178/5 C, 18.05–18.06; 341/22–23, 33–34
See application file for complete search history.

(56) References Cited

U.S. PATENT DOCUMENTS

| | | | | |
|---|---|---|---|---|
| 6,369,803 | B2 * | 4/2002 | Brisebois | G06F 3/03547 |
| | | | | 178/18.01 |
| 2002/0134828 | A1 * | 9/2002 | Sandbach | G06F 1/1632 |
| | | | | 235/60.12 |
| 2007/0257821 | A1 * | 11/2007 | Son | G06F 3/016 |
| | | | | 341/22 |
| 2008/0018609 | A1 * | 1/2008 | Baker | G06F 3/045 |
| | | | | 345/173 |
| 2010/0328251 | A1 * | 12/2010 | Sinclair | G06F 3/016 |
| | | | | 345/174 |
| 2011/0148793 | A1 * | 6/2011 | Ciesla | G06F 3/0202 |
| | | | | 345/173 |
| 2012/0092263 | A1 * | 4/2012 | Peterson | G06F 3/016 |
| | | | | 345/168 |
| 2013/0227836 | A1 * | 9/2013 | Whitt, III | H01H 13/704 |
| | | | | 29/622 |
| 2014/0249495 | A1 * | 9/2014 | Mumby | A61F 13/00059 |
| | | | | 604/359 |

* cited by examiner

*Primary Examiner* — Hong Zhou
(74) *Attorney, Agent, or Firm* — Kilpatrick Townsend & Stockton LLP

(57) ABSTRACT

Input devices having a thin profile and good comfort and feel are disclosed. In embodiments, an input device includes a sensor layer configured to effectuate a key press upon application of an activation force, and a collapsible layer coupled to the sensor layer. The collapsible layer may be configured to collapse in response to a collapsing force that is substantially equal to the activation force. When the collapsible layer collapses, the sensor layer may simultaneously effectuate the key press in response to application of the collapsing force.

18 Claims, 11 Drawing Sheets

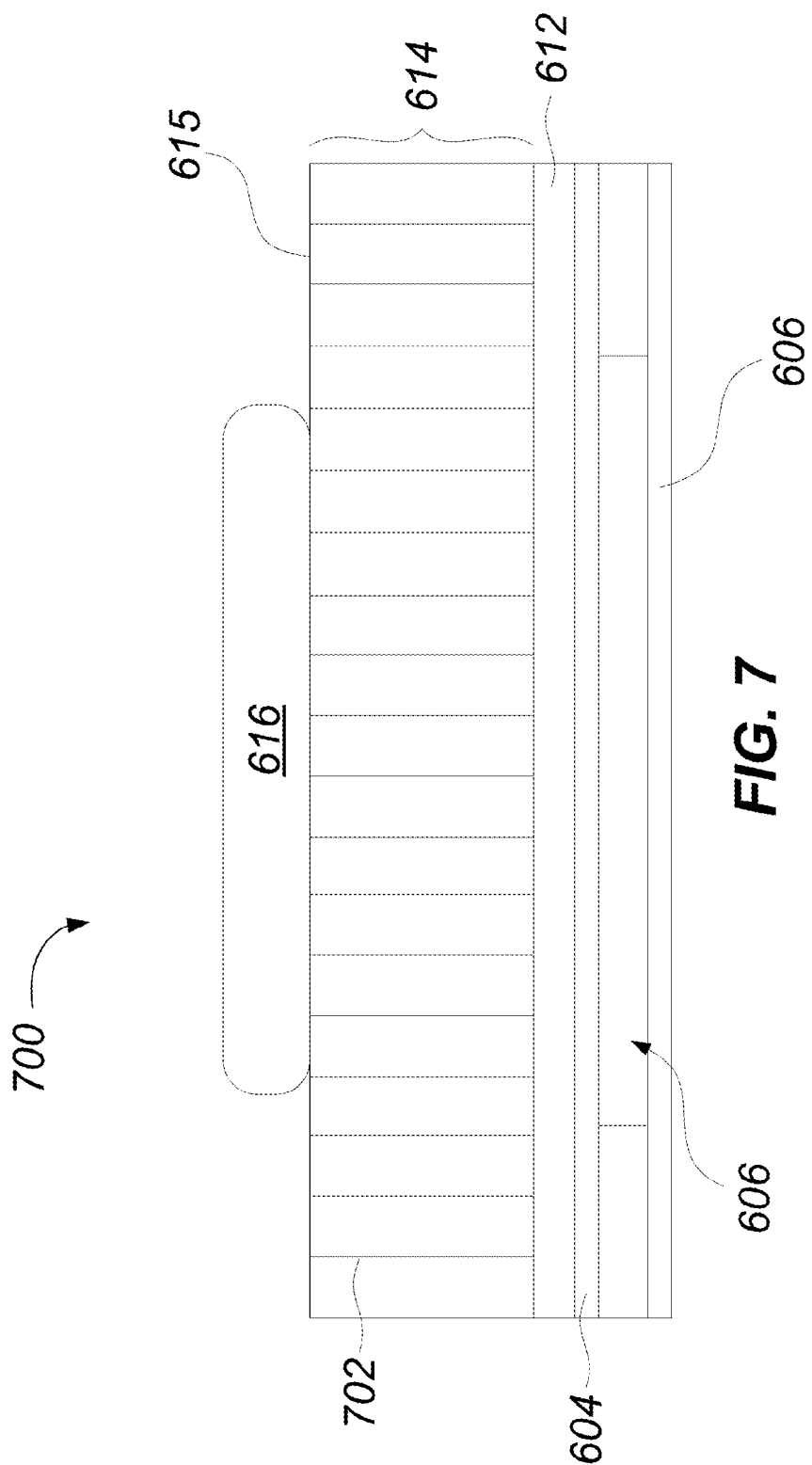

SOLID STATE INPUT DEVICE

BACKGROUND

Input devices for modern computer systems are typically used to convert analog inputs (e.g., touches, clicks, motions, gestures, button presses, etc.) into digital signals for computer processing. An input device can include any device used to provide data and control signals to an information processing system such as a computer. Some non-limiting examples of input devices include keyboards, key pads, computer mice, remote controls, gaming controllers, joysticks, trackballs, and the like.

Input devices, such as keyboards, are typically designed to maximize comfort and feel when being used. A typical keyboard that is comfortable to use and has good feel is one that has keys that provide resistance when pressed until a certain point at which the keys compress to effectuate a key press. This force profile may be referred to as an S-curve force profile. Conventional keyboard designs that successfully achieve this force profile include mechanical keys such as scissor keys. However, keyboards that utilize mechanical keys are often bulky, heavy, and occupy a lot of space, which are not desirable for keyboards that are designed to be smaller and more compact. To decrease keyboard size and weight, such keyboards may sacrifice comfort and feel, thereby losing customer appeal. Improvements to such keyboards are desired.

SUMMARY

Embodiments are directed to keyboard that has good comfort and feel but is also flexible and compact in size. In certain embodiments, the keyboard is a solid state keyboard that includes a collapsible layer coupled to a sensor layer. The collapsible layer may have a force profile that is substantially similar to an S-curve force profile. The collapsible layer and sensor layer may be designed with one another in mind such that when the collapsible layer collapses upon application of force from a user, the sensor layer effectuates a key press in a seamless manner.

Certain embodiments of the invention include an input device including a sensor layer configured to effectuate a key press upon application of an activation force, and a collapsible layer coupled to the sensor layer. The collapsible layer may be configured to collapse in response to a collapsing force that is substantially equal to the activation force, such that both the collapsible layer collapses and the sensor layer effectuates the key press in response to application of the collapsing force.

The collapsible layer may have a non-linear force profile. The non-linear force profile may follow an S-curve profile. In some embodiments, a spacer stiffness determines the activation force required to effectuate the key press. The collapsible layer may include continuous fiber knitted into a three-dimensional spacer fabric. The continuous fiber may include fibers of natural or synthetic origin and consist of mono- or poly-filament.

In some embodiments, the sensor layer includes a sensor membrane. The sensor membrane may include a first conductive contact layer, a second conductive contact layer, and a non-conductive spacer layer disposed between the first and second contact layers. The spacer layer may have a spacer thickness. The spacer layer may include an opening such that the first and second contact layers are separated by empty space within the opening. The first and second contact layers may make contact within the opening in response to the activation force that pushes the first and second contact layers together.

The input device may further include a keycap coupled to the collapsible layer and directly above the opening of the spacer layer. In certain embodiments, the input device may further include a filler material disposed in the openings of the spacer layer to tailor the activation force required to push the first and second contact layers together. The filler material may be a resistive material. In some embodiments, the bottom contact layer and the top contact layer comprise bottom and top conductive combs, respectively. The bottom conductive comb may be arranged substantially perpendicular to the top conductive comb. In embodiments, the input device may further include a non-conductive covering. A portion of the non-conductive covering may be disposed between the collapsible layer and the sensor layer.

In embodiments, a method of forming an input device includes forming a sensor layer configured to effectuate a key press upon application of an activation force, and forming a collapsible layer coupled to the sensor layer. The collapsible layer may be configured to collapse in response to a collapsing force that is substantially equal to the activation force, such that both the collapsible layer collapses and the sensor layer effectuates the key press in response to application of the collapsing force.

The method may further include forming a non-conductive covering. A portion of the non-conductive covering may be disposed between the collapsible layer and the sensor layer.

In certain embodiments, a computer system includes a processor and an input device coupled to the processor. The input device may include a sensor layer configured to effectuate a key press upon application of an activation force, and a collapsible layer coupled to the sensor layer. The collapsible layer may be configured to collapse in response to a collapsing force that is substantially equal to the activation force, such that both the collapsible layer collapses and the sensor layer effectuates the key press in response to application of the collapsing force.

The collapsible layer may have a non-linear force profile. The non-linear force profile may follow an S-curve profile.

A better understanding of the nature and advantages of embodiments of the present invention may be gained with reference to the following detailed description and the accompanying drawings.

BRIEF DESCRIPTION OF THE DRAWINGS

FIG. 7 is a simplified diagram illustrating details of a collapsible layer, according to embodiments of the present invention.

DETAILED DESCRIPTION

Input devices, such as keyboards, having good comfort and feel while achieving a compact size are disclosed herein. The compact keyboard may be a solid state keyboard that includes a collapsible layer disposed on top of a sensor layer. The collapsible layer may be structured to have a force profile that is substantially similar to an S-curve force profile. The collapsible layer and sensor layer may be designed with one another in mind such that when the collapsible layer collapses upon application of force from a user, the sensor layer effectuates a key press in a seamless manner. In embodiments, the sensor layer may include a pair of contacts that are pressed against one another to effectuate a key press. The collapsible layer and sensor layer may have thin profiles such that the overall thickness of the solid state keyboard is compact. The materials used to form the solid state keyboard may enable it to be flexible so that it could be easily bent and/or rolled up. Additionally, because the collapsible layer has a unique force profile, the solid state keyboard is comfortable and has a feel that is comparable to mechanical keys when used.

The solid state keyboard may be used as an input device in a computer system. To better understand the role of the solid state keyboard, an exemplary computer system is described.

I. Exemplary Computer System

Figure 1:
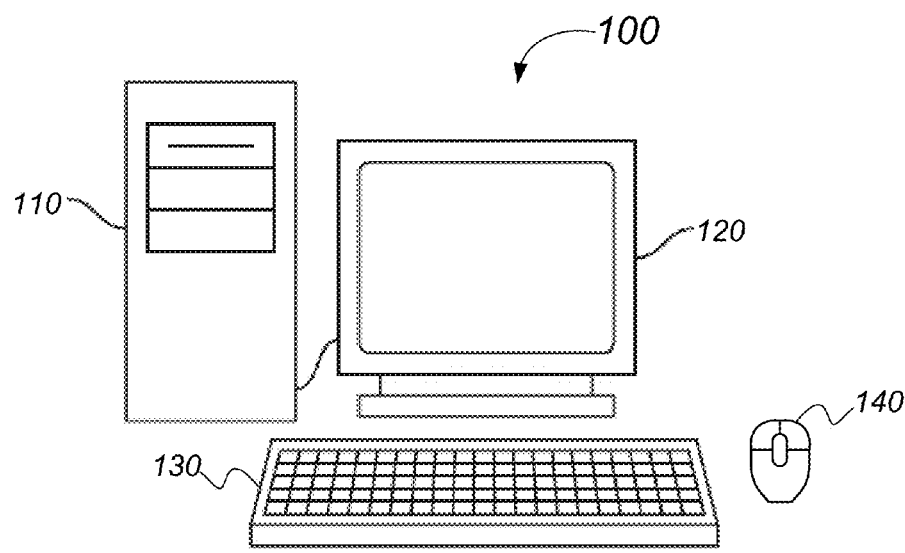
FIG. 1 is a simplified diagram of a computer system, according to embodiments of the present invention.

FIG. 1 is a simplified schematic diagram of a computer system 100 according to an embodiment of the present invention. Computer system 100 includes computer 110, monitor 120, keyboard 130, and mouse 140. In embodiments, keyboard 130 can be any suitable device capable of being used to convert analog input signals into digital signals for computer processing. As an example, keyboard 130 may be a input device with a plurality of keys that can be pressed to effectuate a key press. The key press may cause a corresponding input to be generated in computer system 100. For computer system 100, keyboard 130 and mouse 140 can be configured to control aspects of computer 110 and monitor 120.

In some embodiments, computer 110 may include a machine readable medium (not shown) that is configured to store computer code, such as keyboard driver software, and the like, where the computer code is executable by a processor (not shown) of the computer 110 to affect control of the computer 110 by keyboard 130. The various embodiments described herein generally refer to keyboard 130, or similar input device, however it should be understood that keyboard 130 can be any input/output (I/O) device, user interface device, control device, input unit, or the like.

Figure 2:
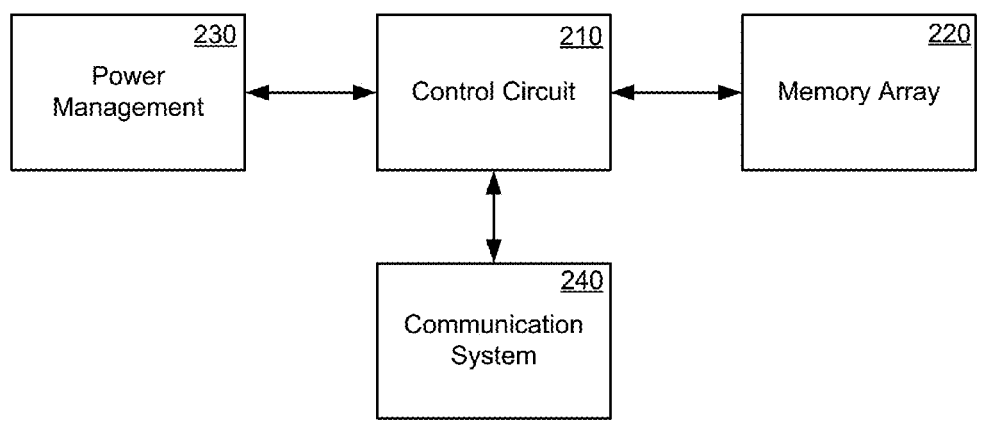
FIG. 2 is a simplified block diagram of a system configured to operate an input device, according to embodiments of the present invention.

FIG. 2 is a simplified block diagram of a system 200 configured to operate keyboard 130, according to certain embodiments of the invention. System 200 includes control circuit 210, memory array 220, power management system 230, and communication system 240. Each of the system blocks 220, 230, and 240 can be in electrical communication with the control circuit 210. System 200 may further include additional systems that are not shown or discussed to prevent obfuscation of the novel features described herein. Each system block 220, 230, and 240 may be individual electrical components that perform necessary functions for keyboard operation. System blocks 220, 230, and 240 may be implemented as separate modules, or alternatively, more than one system block may be implemented in a single module.

In certain embodiments, control circuit 210 comprises one or more microprocessors (μCs) and can be configured to control the operation of system 200. Alternatively, control circuit 210 may include one or more microcontrollers (MCUs), digital signal processors (DSPs), or the like, with supporting hardware and/or firmware (e.g., memory, programmable I/Os, etc.), as would be appreciated by one of ordinary skill in the art. In embodiments, control circuit 210 may be configured to generate an input signal when a key press is effectuated. Effectuation of the key press may be performed by connecting two conductive lines with one another. When connected, a circuit may be completed and an input signal may be generated according to the specific key pressed. Details of such operation will be discussed further herein.

Memory array 220 may be configured to store information pertaining to keys of a keyboard. For instance, information stored in memory array 220 may establish an input value for a corresponding key of the keyboard so that when a key is pressed, the corresponding input value may be generated. Additionally, memory array 220 can store one or more software programs to be executed by processors (e.g., in control circuit 210). It should be understood that "software" can refer to sequences of instructions that, when executed by processing unit(s) (e.g., processors, processing devices, etc.), cause system 200 to perform certain operations of software programs. The instructions can be stored as firmware residing in read only memory (ROM) and/or applications stored in media storage that can be read into memory for processing by processing devices. Software can be implemented as a single program or a collection of separate programs and can be stored in non-volatile storage and copied in whole or in-part to volatile working memory during program execution.

Power management system 230 can be configured to manage power distribution, recharging, power efficiency, and the like, for keyboard 130. In some embodiments, power management system 230 can include a battery (not shown), a USB based recharging system for the battery (not shown), and power management devices (e.g., low-dropout voltage regulators—not shown). In certain embodiments, the functions provided by power management system 230 may be incorporated into the control circuit 210. The power source can be a replaceable battery, a rechargeable energy storage device (e.g., super capacitor, Lithium Polymer Battery, NiMH, NiCd), or a corded power supply. The recharging system can be an additional cable (specific for the recharging purpose) or it can use the mouse's USB connection to recharge the battery. In embodiments, components of power management system 230 are designed to have a low profile to maximize portability of the solid state keyboard. For instance, the components may have a thickness similar to the thickness of the solid state keyboard.

Communications system 240 can be configured to provide wireless communication with the computer 110, or other devices and/or peripherals, according to certain embodiment of the invention. Communications system 240 can be configured to provide radio-frequency (RF), Bluetooth, infrared, or other suitable communication technology to communicate with other wireless devices. System 200 may optionally comprise a hardwired connection to computer 110. For example, keyboard 130 can be configured to receive a Universal Serial Bus (USB) cable to enable bi-directional electronic communication with computer 110 or other external devices. Some embodiments may utilize different types of cables or connection protocol standards to establish hardwired communication with other entities.

Although certain necessary systems may not expressly discussed, they should be considered as part of system 200, as would be understood by one of ordinary skill in the art. For example, system 200 may include a bus system to transfer power and/or data to and from the different systems therein.

It should be appreciated that system 200 is illustrative and that variations and modifications are possible. System 200 can have other capabilities not specifically described herein. Further, while system 200 is described with reference to particular blocks, it is to be understood that these blocks are defined for convenience of description and are not intended to imply a particular physical arrangement of component parts. Further, the blocks need not correspond to physically distinct components. Blocks can be configured to perform various operations, e.g., by programming a processor or providing appropriate control circuitry, and various blocks might or might not be reconfigurable depending on how the initial configuration is obtained.

Embodiments of the present invention can be realized in a variety of apparatuses including electronic devices implemented using any combination of circuitry and software. Furthermore, aspects and/or portions of system 200 may be combined with or operated by other sub-systems as required by design. For example, customization control block 220 may operate within control circuit 210 instead of functioning as a separate entity. In addition, the inventive concepts described herein can also be applied to a mouse, keypad, or other similar input device. For example, a mouse can include buttons incorporating the sensor layer and collapsible layer as described in configurations herein. The foregoing embodiments are not intended to be limiting and those of ordinary skill in the art with the benefit of this disclosure would appreciate the myriad applications and possibilities.

In embodiments, keyboard 130 may be structured to have a compact size, while achieving good comfort and feel. Such structure is discussed in more detail further herein.

II. Solid State Input Device

Solid state devices are devices that are built with solid materials in which charge carriers are confined. The charge carriers may flow through conductive lines to transmit signals. An array of such devices may form a sensor layer, such as a sensor membrane, for an input device. In such circumstances, the input device may be considered as a solid state input device. The sensor membrane may generate input signals when specific regions are depressed. Unlike traditional input devices that include mechanical structures, e.g., springs, hinges, and the like, solid state input devices may not include such moving parts. Instead, solid state input devices may be primarily formed of the sensor membrane containing a large number of conductive lines for signal routing. Such solid state input devices may effectuate a key press by connecting two conductive lines by pressing them against one another, as discussed herein. Although a sensor membrane is discussed, one skilled in the art understands that any suitable sensor structure may be used in the solid state devices discussed herein without departing from the spirit and scope of the present invention. For instance, the sensor layer may include a dome structure for effectuating a key press.

FIG. 3A illustrates an exemplary sensor membrane 300 for effectuating a key press according to embodiments of the present invention. Sensor membrane 300 may be formed of a top conductive contact layer 302, a bottom conductive contact layer 304, and a non-conductive spacer layer 306. Spacer layer 306 may have an opening 308 that separates top contact layer 302 from bottom contact layer 304 such that the two layers are initially electrically isolated from one another. Spacer layer 306 can be a printed feature with a sufficient physical dimension or a cutout layer from a continuous sheet. Under application of force, top contact layer 302 and bottom contact layer 304 may connect with one another, as shown in FIG. 3B.

FIG. 3B illustrates sensor membrane 300 when an external downward force 310 is applied to effectuate a key press. Force 310 may depress top contact layer 302 downward into opening 308 such that it connects with bottom contact layer 304. In embodiments, top contact layer 302 bends downward upon application of force 310, and may return to its unbent shape upon removal of force 310. When connected, a circuit may be completed and current may flow between top and bottom contact layers 302 and 304. The flow of current may be used to generate in input device to effectuate a key press. Details of how sensor membrane 300 may be configured to alter an amount of force to effectuate a key press will be discussed further herein.

Although FIGS. 3A-3B may illustrate a sensor membrane 300 having one opening 308 within which top contact layer 302 may depress to effectuate a key press, embodiments are not so limited. For instance, sensor membrane 300 may be a subset of an entire inner component for a solid state keyboard device, as shown in FIG. 4.

Figure 4:
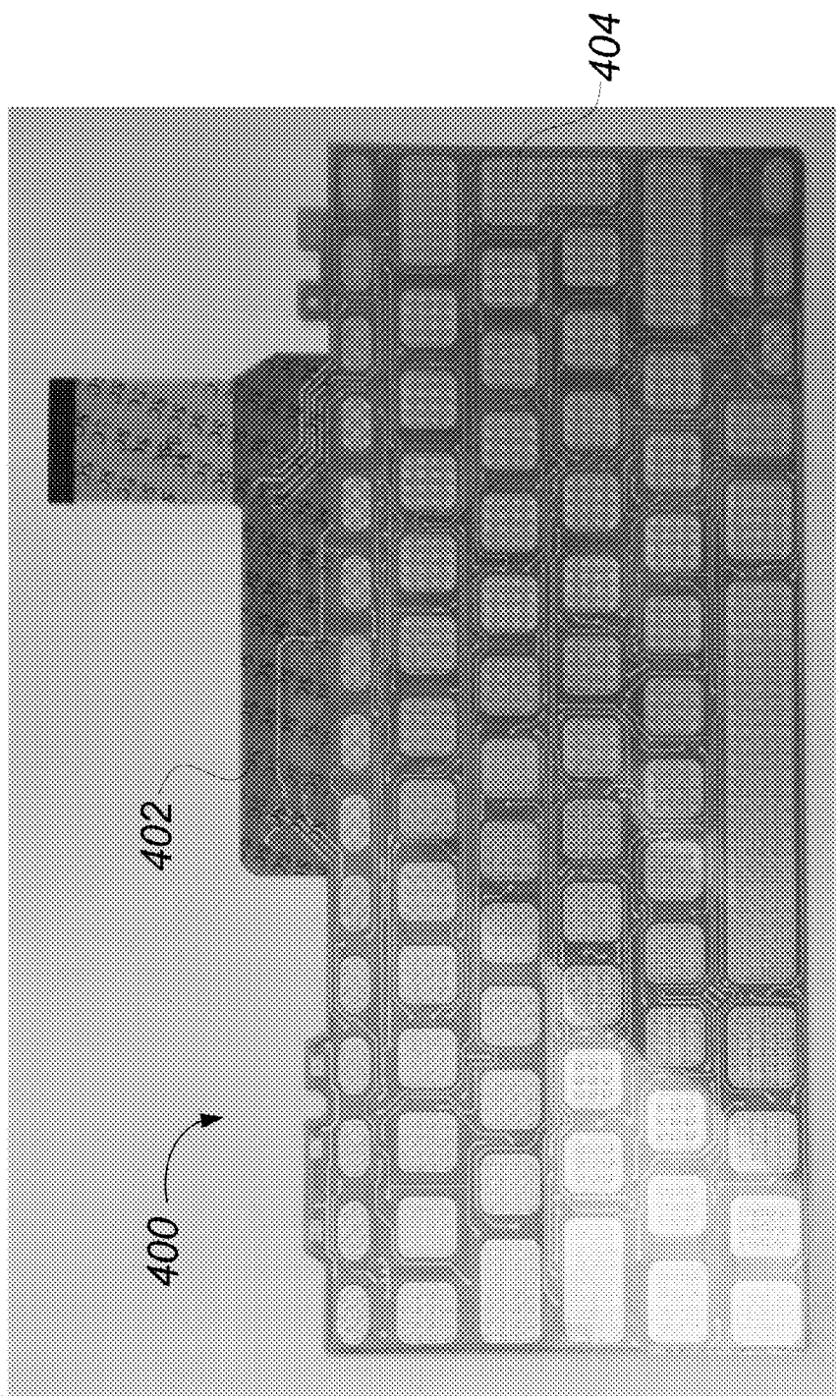
FIG. 4 is a broad top-view perspective of an inner component for an input device, according to embodiments of the present invention.

FIG. 4 illustrates a top-view perspective of an inner component 400 for an exemplary keyboard, such as keyboard 130, according to embodiments of the present invention. In some embodiments, inner component 400 may be a component designed to enable effectuation of a key press for a solid state keyboard. Inner component 400 may include a sensor layer 402 and a plurality of key regions 404. Sensor layer 402 may be a structure that conforms to the general shape of a keyboard and may contain various conductive routing lines for transmission of signals from key regions 404. Sensor layer 402 may include a sensor membrane, such as sensor membrane 300. In embodiments, key regions 404 are areas of sensor layer 402 where keys for a keyboard are located. For instance, a key region 404 may be an area where the "enter" button for a keyboard will be placed. Accordingly, key regions 404 may be organized in a standard keyboard arrangement.

In embodiments, key regions 404 include structures that enable a key press when force is applied, such as when a user presses a key on a keyboard. For example, key regions 404 are regions where openings are located to allow a top contact layer to depress and connect with a bottom contact layer when force is applied to effectuate a key press, as discussed herein.

Figure 5:
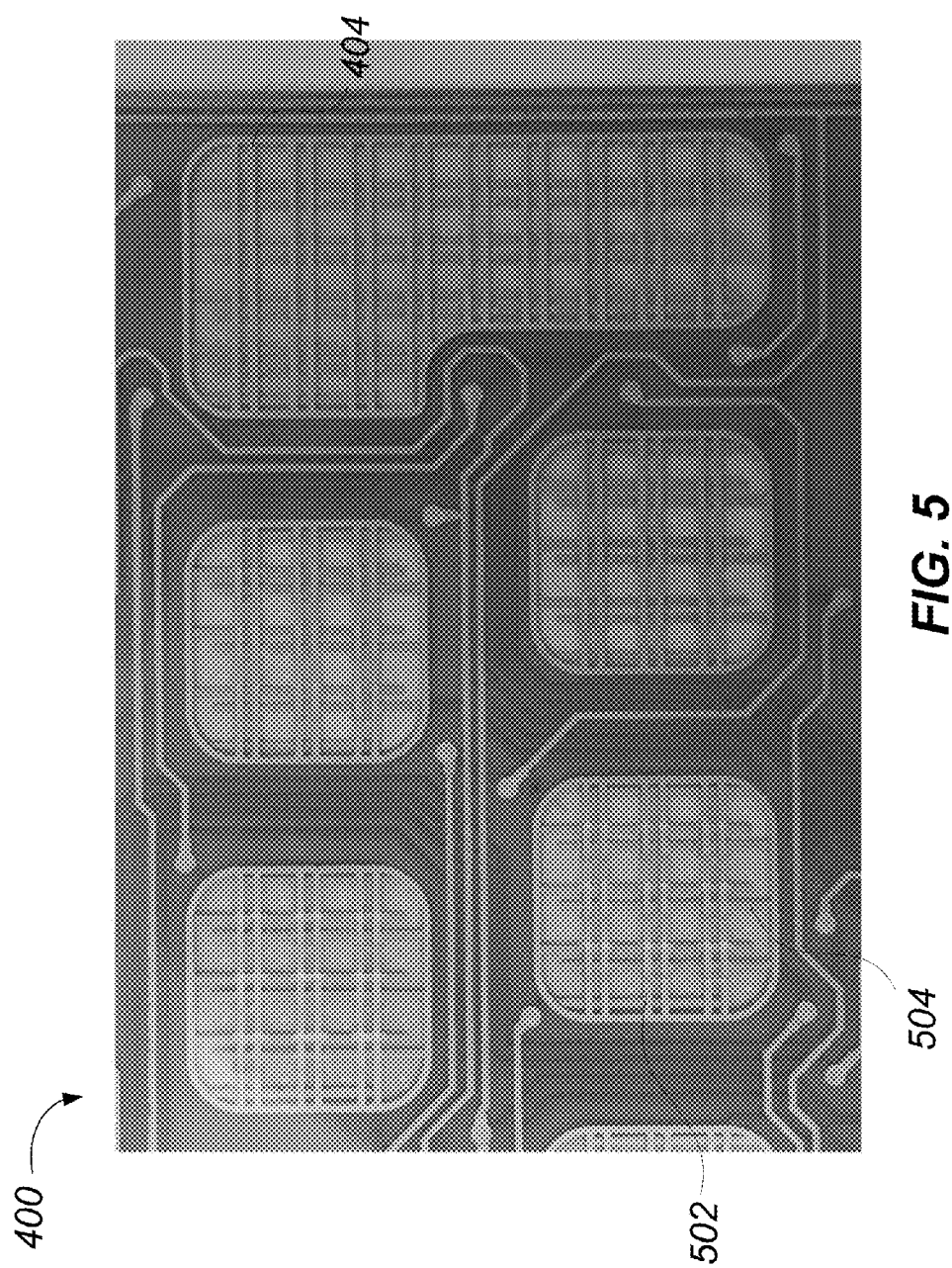
FIG. 5 is a zoomed-in top-view perspective of the inner component for the input device, according to embodiments of the present invention.

FIG. 5 is a close-up view of an area of inner component 400 to better show the arrangement of key regions 504. In embodiments, key regions 504 may include an arrangement of conductors that effectuate a key press when force is applied. For instance, key regions 504 may include at least two conductors: a first conductor 502 and a second conductor 504. First and second conductors 502 and 504 may correspond with top and bottom contacts 302 and 304, respectively. Each conductor may be a portion of a larger circuit that is designed to effectuate a key press when the conductors 502 and 504 connect with one another.

Conductors 502 and 504 may be structured to allow effectuation of a key press across a maximum area of key regions 504. For instance, conductor 502 and 504 may have a comb-like structure that spans across an entire area of key regions 504. As shown in FIG. 4, the comb-like structure of conductors 502 and 504 may include an array of elongated fins that extend across a majority of a length of each key region 504. Further, the elongated fins may each be positioned beside one another such that the array of fins spans across each key regions 504. The number of elongated fin may be sufficient to span across key regions 504. More number of elongated fins may be needed to span across larger distances of key regions 504.

In embodiments, conductors 502 and 504 are oriented such that they may contact one another when force is applied. For instance, conductors 502 may be perpendicular to conductors 504. That way, a grid-like pattern may be formed across each entire key region 504. In other embodiments, conductors 502 may be parallel, but overlapping with, conductors 504. Although embodiments illustrate the elongated fins as having a vertical construction, embodiments are not limited to such configurations. For instance, the fins may have a curved, zig-zag, and any other construction to contact one another when force is applied while maximizing an area for effectuating a key press.

In embodiments, the space between conductors 502 and 504 may be determined based upon an activation force, which may be tuned according to a collapsing layer, as will be discussed further herein.

III. Construction

Figure 6:
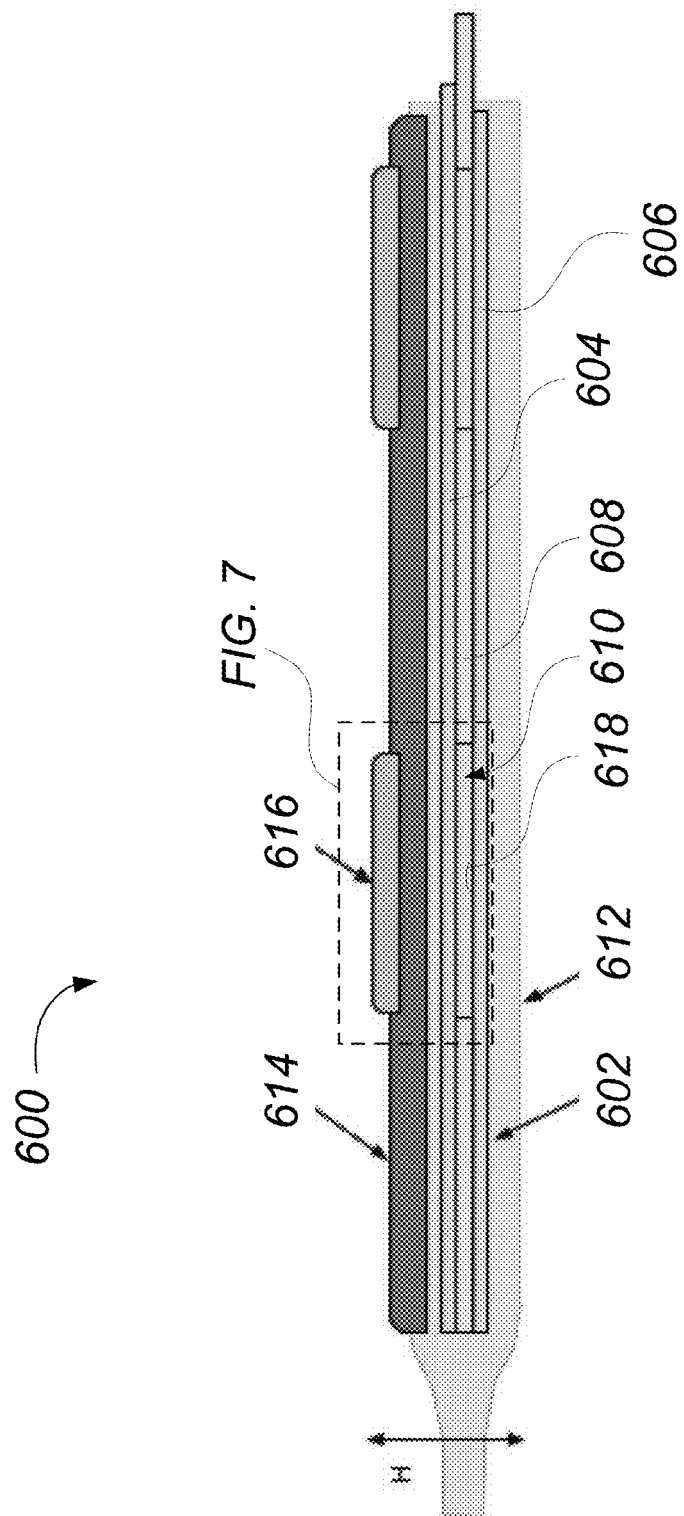
FIG. 6 is a simplified diagram of a cross-sectional view of an input device, according to embodiments of the present invention.

FIG. 6 illustrates a cross-sectional view of an inner component 600 for a solid state keyboard according to embodiments of the present invention. It is to be appreciated that FIG. 6 illustrates a subset of an entire inner component for a solid state keyboard. Inner component 600 may include several parts which will be discussed further herein.

A. Sensor Layer

Figure 3:
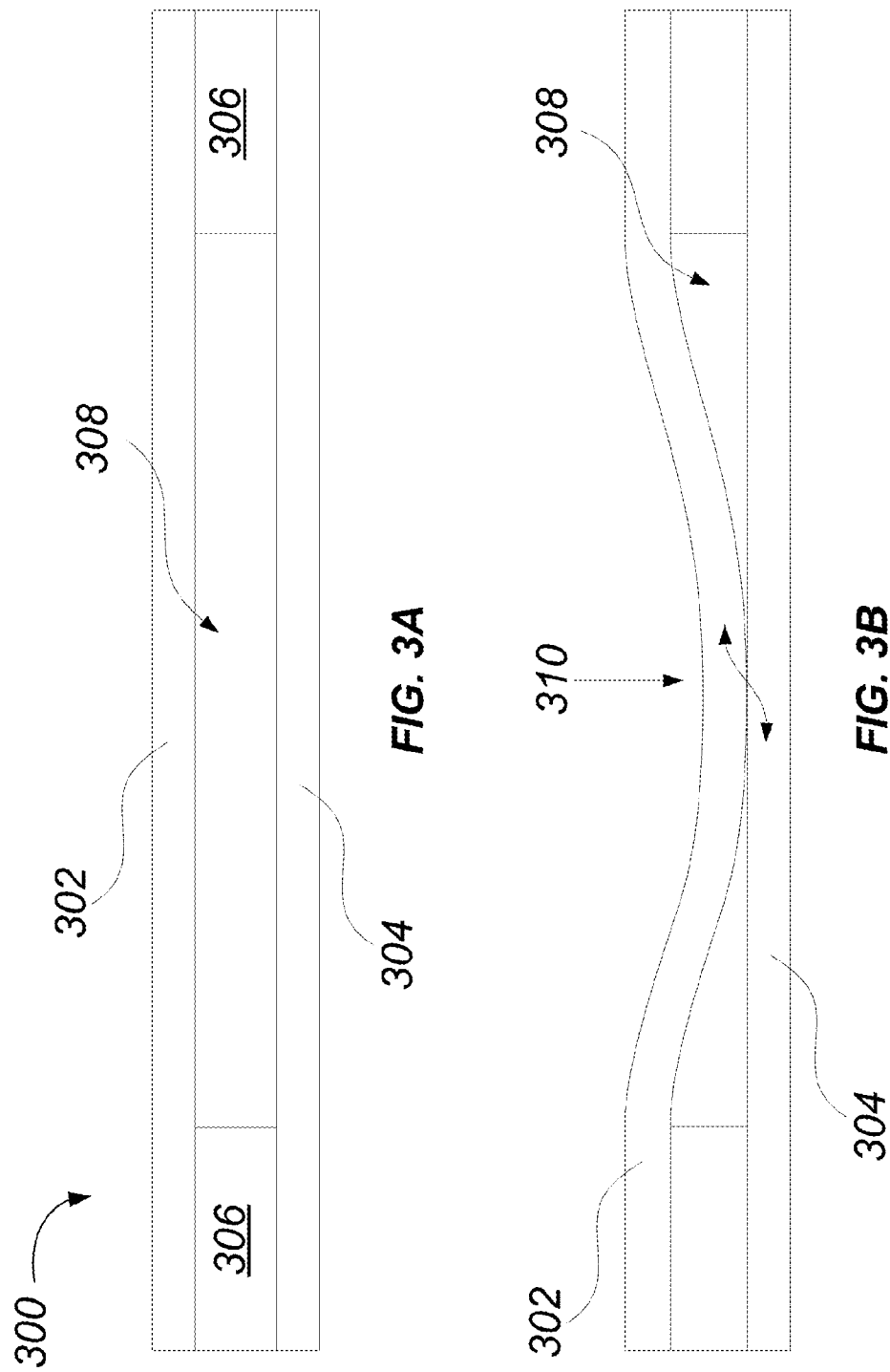
FIGS. 3A-3B are simplified diagrams of a solid state sensor layer, according to embodiments of the present invention.

Inner component 600 may include a sensor layer 602, such as sensor membrane 300 discussed in FIG. 3, that can be depressed to effectuate a key press. In embodiments, sensor layer 602 may be formed of a top conductive contact layer 604 and a bottom conductive contact layer 606. The top contact layer 604 and bottom contact layer 606 may be portions of an open circuit that closes when the contact layers touch one another. In some embodiments, top contact layer 604 may correspond with conductor 502 of FIG. 5, and bottom contact layer 606 may correspond with conductor 504. As will be discussed further herein, top and bottom conductive contact layers 604 and 606 may be formed of a flexible base material coated with a conductive material to allow movement of electrons. The flexible base material allows the conductive contact layers 604 and 606 to bend during effectuation of a key press as discussed herein.

In embodiments, sensor layer 602 also includes a non-conductive spacer layer 608. Spacer layer 608 may be disposed between top contact layer 604 and bottom contact layer 606. A plurality of openings 610 may be disposed within spacer layer 608 such that some regions of contact layers 604 and 606 do not have spacer layer 608 disposed between them. Openings 610 may be located in areas of the spacer layer 608 that correspond to locations of keys for a keyboard, such as key regions 404 discussed herein with respect to FIG. 4. Openings 610 may separate contact layers 602 and 604 from one another by a certain distance. The distance may be determined by a height of spacer layer 608.

Openings 610 may be designed to allow effectuation of a key press when downward force is applied to top contact layer 604 in the area where opening 610 is located. For instance, openings 610 may electrically isolate top contact layer 604 from bottom contact layer 606, but also enable them to make contact with one another when downward force is applied upon top contact layer 604. When downward force is applied, top contact layer 604 may bend within opening 610 and make contact with bottom contact layer 604. When such contact is made, the open circuit may be closed and a signal may be generated, thereby effectuating a key press.

In embodiments, a minimal amount of force required to make top contact layer 604 touch bottom contact layer 606 may be defined as an activation force. The activation force may be selected to be high enough to allow a user to rest his or her fingers on the keys of a keyboard without inadvertently effectuating a key press, but not so high as to make it difficult to depress when the user intends to effectuate a key press. Thus, in some embodiments, the activation force may range between 60 to 100 gram-force (gf), and preferably about 50 gf in certain embodiments.

To achieve this target activation force, sensor layer 602 may be modified. In embodiments, sensor layer 602 may be modified to achieve the target activation force in various ways. For instance, a thickness of spacer layer 608 may be modified to be thicker or thinner. Having a thicker spacer layer 608 increases the distance between top contact layer 604 and bottom contact layer 606. Thus, top contact layer 604 may need to traverse more distance to touch bottom contact layer 606. Having to traverse more distance may result in a higher activation force. Alternatively, having a thinner spacer layer 608 decreases the distance, thereby making it easier to effectuate a key press. In other embodiments, a stiffness of top contact layer 604 may be modified to achieve the target activation force. A stiffer top contact layer 604 may result in a higher activation force because it may be more difficult to press down to bend top contact layer 604.

Another way to modify sensor layer 602 to achieve a target activation force is to include a filler material in openings 610. The filler material may be any non-conductive material that resists deformation of top contact layer 604. For instance, the filler material may be a viscous solution. The amount by which the activation force increases or decreases may depend upon the viscosity of the filler material. More viscous filler materials may result in higher activation forces when compared to less viscous filler materials. However, including any viscous material may result in a higher activation force when compared to not including any viscous material. When no viscous material is used, openings 610 may be filled with air.

Yet another way to modify sensor layer 602 to achieve a target activation force is to alter the thickness of top contact layer 604. A thicker top contact layer 604 will more strongly resist deformation, such as when top contact layer 604 is being bent toward bottom contact layer 606 during effectuation of a key press. Accordingly, thicker top contact layers 604 may result in higher activation forces, and vice versa. One skilled in the art understands that any suitable alteration of contact layers 604 and 606, openings 610, and spacer layer 608 may be used without departing from the spirit and scope of the present invention.

In embodiments, additional spacer structures (not shown) may be included in openings 610 to prevent inadvertent contacting between top and bottom contact layers 604 and 606. Inadvertent contacting may occur because external forces, such as gravity or compressive forces when sensor layer 602 is bent, may cause the two contact layers to contact one another. The amount of force that causes inadvertent contacting may be lower than the activation force. In some embodiments, the additional spacers may be formed inside the opening 610 to prevent such inadvertent contacting between top and bottom contact layers 604 and 606. For instance, bumps 618 formed of a compressible non-conductive material may be formed on top and/or bottom conductive layers 604 and/or 606. Bumps 614 may be disposed near the center of opening 610. Additionally, bumps 614 may be compressible to prevent contacting between top and bottom contact layers 604 and 606 under low force, but allow contacting under activation force. In embodiments, bumps 614 prevent contacting under forces below 20 gf. In particular embodiments, bumps 614 prevent contacting under forces below 40 gf.

Top and bottom conductive contact layers 604 and 606 spacer layer 608 may be formed of any suitable material to enable effectuation of a key press according to embodiments of the present invention. For instance, all three layers may be formed of a bendable material that may or may not be covered with materials with specific conductive properties. As an example, all three layers may be formed of polyethylene terephthalate (PET) films, or better known as polyester films. Because polyester films are inherently non-conductive, conductive layers 604 and 606 may be coated with a conductive material to allow effectuation of a key press as discussed herein. In embodiments, the conductive material may be any suitable material capable of enabling movement of electrons, such as silver, aluminum, copper, gold, and the like. For instance, top and bottom conductive contact layers 604 and 606 may be formed of a patterned PET base material coated with silver. Spacer layer 608 may not be coated with a conductive material and may thus remain as a non-conductive material to prevent electrical cross-talk between contact layers 604 and 606.

Although all three layers may be formed of PET film, embodiments are not so limited. For instance, conductive layers 604 and 606 may be formed of a thin layer of conductive material, such as a metal. As an example, conductive layers 604 and 606 may be formed of aluminum, copper, gold, and the like, and any combination of such materials in an alloy or disposed one on top of the other.

Utilizing sensor layer 602 in an input device is advantageous given its low profile and low cost. However, because of its lack of mechanical parts, sensor layer 602 may not provide good comfort and feel when implemented in a solid state keyboard design by itself. According to embodiments of the present invention, sensor layer 602 may be combined with a collapsible layer. The combination of sensor layer and collapsible layer may provide the benefits of compact size and low cost while achieving good comfort and feel.

B. Covering

In embodiments, sensor layer 602 may be encapsulated by a non-conductive covering 612. Covering 612 may encapsulate sensor layer 602 to protect sensor layer 602 from intrusion of particles such as dust and debris. In such embodiments, covering 612 may cover the entire sensor layer 602. In alternative embodiments, covering 612 may not cover the entire sensor layer 602. For example, covering 612 may cover a portion of sensor layer 602. Covering 612 may be formed of a material that is non-permeable and flexible. For instance, covering 612 may be formed of a plastic film, rubber, and/or non-permeable fabrics (Tyvek, etc.).

C. Collapsible Layer

Inner compartment 600 may also include a collapsible layer 614 disposed on covering 612 and above sensor layer 602. Thus, a portion of covering 612 may be disposed between collapsible layer 614 and sensor layer 602. Keycaps 616 may be attached to a top surface of covering 612 to provide a structure upon which a user may apply a downward force to effectuate a key press. In embodiments, keycaps 616 are disposed above openings 610 so that when a downward force is applied upon keycap 616, a respective opening is depressed to allow top and bottom contact layers 604 and 606 to touch one another, as discussed herein.

In some embodiments, keycaps 616 may include keyguides to assist in guiding a user's fingers to certain keycaps. The keyguides may be any suitable structure and/or contour of keycaps 616 that achieves such purposes. For instance, keyguides may be a protrusion on keycaps 616, or an indentation in keycaps 616. In certain embodiments, keycaps 616 may form a scoop profile such that a user's finger may rest at the bottom of the scoop profile. Keycaps 616 may be formed of any suitable material suitable for allowing a downward force to effectuate a key press. As an example, keycaps 616 may be formed of rubber, plastic, metal, and the like.

According to embodiments of the present invention, collapsible layer 614 is a layer that transfers downward force applied to keycap 616 onto respective key regions of sensor layer 602. Transferring of force is made when collapsible layer 614 collapses and ceases to sufficiently resist the applied downward force. Collapsible layer 614 may thus affect the way keycaps 616 feel when depressed to effectuate a key press. In embodiments, collapsible layer 614 is constructed to have a non-linear force profile. Collapsible layer 614 may be designed to create a non-linear profile similar to that of an S-curve profile, as discussed herein, as will be discussed further herein. To achieve the non-linear profile, collapsible layer 614 may be formed to have a unique structure. For instance, collapsible layer 614 may be formed of a structure containing straight, vertical columns that buckle upon application of a certain amount of force, as shown in FIG. 7.

FIG. 7 illustrates a close-up view of a subset of FIG. 6 to better illustrate the details of collapsible layer 614. Specifically, FIG. 7 shows a collapsible key 700 according to embodiments of the present invention. As shown, collapsible layer 614 may include a plurality of columns 702. Columns 702 may be an arrangement of vertically-oriented collapsible structures that resist downward force/pressure applied against top surface 615 of collapsible layer 614. Columns 702 may be evenly spaced apart such that pressure applied against any region of top surface 615 of collapsible layer 614 may be resisted by the same number and arrangement of columns 702. In embodiments, columns 702 are formed of continuous fiber that may be knitted into three-dimensional spacer fabric. The fibers can be of natural or synthetic origin and consist of a mono- or poly-filament. Columns 702 may resist vertical pressure when its vertical structure is intact. However, when columns 702 buckle, i.e., bend, when a certain amount of downward pressure is applied, columns 702 may cease to provide resistance in the vertical direction. Details of how collapsible layer 614 operates and interacts with sensor layer 602 is discussed in further detail herein.

D. Interaction of Collapsible Layer and Sensor Layer

Figure 8A:
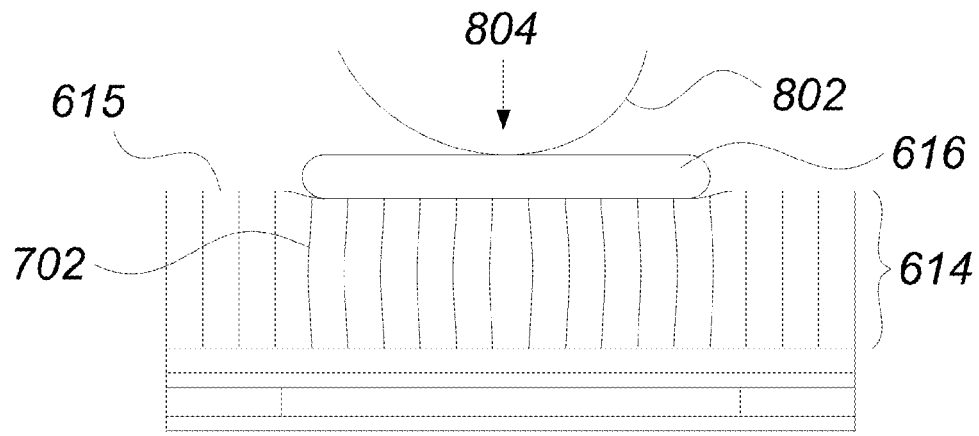
FIG. 8A is a simplified diagram illustrating a collapsible layer resisting downward force applied by a user's finger, according to embodiments of the present invention.
Figure 8B:
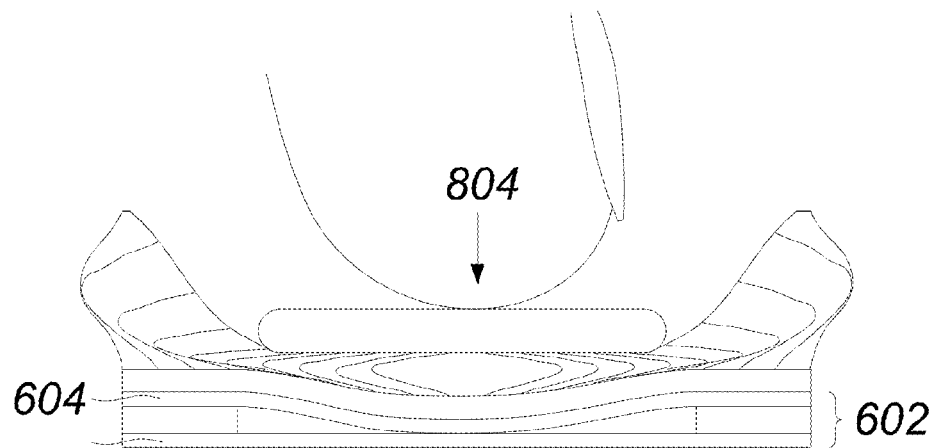
FIG. 8B is a simplified diagram illustrating a collapsible layer interacting with a sensor layer, according to embodiments of the present invention.

FIGS. 8A-8B illustrate how collapsible layer 614 and sensor layer 602 interact when downward force/pressure is applied by an external actor, according to embodiments of the present invention. In FIG. 8A, downward force 804 applied by a user's finger 802 begins to be applied against keycap 616. Since keycap 616 may be formed of a hard material, downward force 804 applied to keycap 616 may be transferred against top surface 615 of collapsible layer 614. Columns 702 disposed under keycap 616 may resist downward force 804. In embodiments, columns 702 may resist a certain amount of force before giving away, e.g., buckling. For instance, columns 702 may resist a threshold amount of downward force until columns 702 buckle. As shown in FIG. 8A, as columns 702 resist downward force 804, columns 702 may slightly bend, but not buckle. "Buckling" as used herein may be defined as a structural collapse of columns 702 such that columns 702 fail to resist any downward force.

As downward force 804 increases to an amount at or above the threshold amount of downward force, columns 702 may buckle and collapse, as shown in FIG. 8B. During collapse, columns 702 of collapsible layer 614 may fail to resist downward force 804 and thus allow finger 802 to move downward. In embodiments, force 804 applied by finger 802 simultaneously applies pressure against sensor layer 602. Thus, when sufficient pressure is applied by finger 802 and collapsible layer 614 collapses, a key press may be effectuated. In embodiments, effectuation of the key press may occur when downward force 804 presses down upon top conductive contact layer 604 of sensor layer 602, causing top contact layer 604 to bend. Downward force 804 may cause top contact layer 604 to bend to a point where it connects with bottom contact layer 606. Once connected, top and bottom contact layers 604 and 606 may close a circuit and allow current to flow to generate an input signal, thereby effectuating a key press.

In embodiments, the amount of force resisted by collapsible layer 614 may be plotted against a travel distance of keycap 616. The resulting curve may establish a force profile curve of collapsible layer 614. The force profile curve of collapsible layer 614 may be labeled as "collapsible key curve." The collapsible key curve may have a profile similar to an S-curve profile of a mechanical key, but different than a curve profile of a foam key, as will be discussed further herein.

E. Mechanical and Foam Keys

Figure 9:
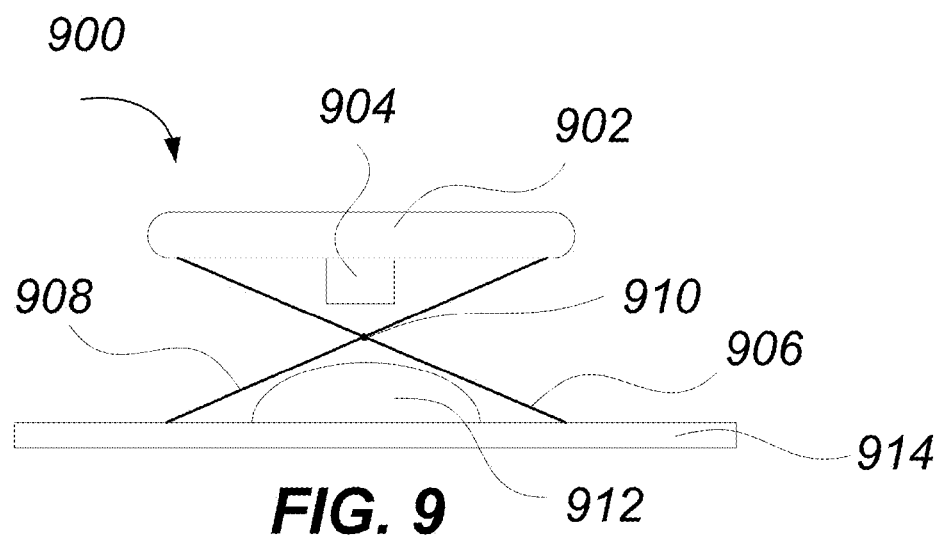
FIG. 9 is a simplified diagram of a mechanical key.
Figure 10:
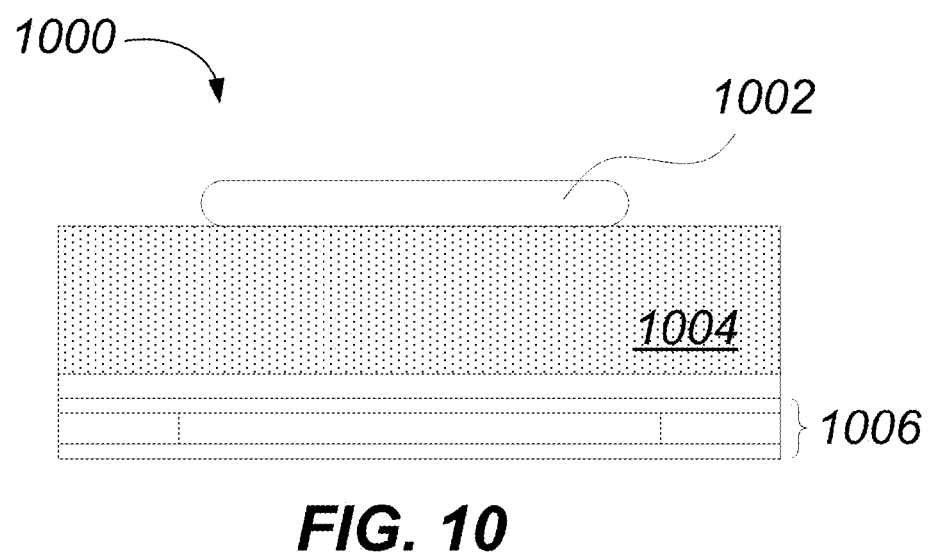
FIG. 10 is a simplified diagram of a foam key.

To better understand how the keys are different from one another, a mechanical and foam key is illustrated in FIGS. 9-10 and briefly described herein. FIG. 9 illustrates a mechanical key 900, such as a scissor key. Mechanical key 900 may include a keycap 902 and a protrusion 904 disposed below keycap 902. Protrusion 904 may extend from a bottom surface of keycap 902. Actuator arms 908 and 906 may crisscross one another like blades of a scissor. Additionally, actuator arms 908 and 906 may be attached to one another at hinge 910. Hinge 910 may allow the actuator arms 908 and 906 to rotate respective to one another. A dome 912 may be disposed on a circuit board 914. Dome 912 may be positioned such that protrusion 904 may compress dome 912 when depressed. For instance, dome 912 may be disposed below the protrusion 904. To effectuate a key press, a downward force is applied against keycap 902 which causes actuator arms 908 to pivot against one another at hinge 910. As the keycap 902 moves downward, protrusion 904 may press upon dome 912 to effectuate a key press. The actuator arms may be configured to provide an S-curve profile, which will be discussed further herein. Although FIG. 9 illustrates an exemplary scissor key, other mechanical keys may be used to illustrate keys having S-curves. For instance, instead of actuator arms 908 and 906, one or more springs may be used instead.

FIG. 10 illustrates a foam key 1000. Foam key 1000 includes a keycap 1002 disposed on a foam layer 1004. Foam layer 1004 may be formed of a porous material that has a substantially exponential force profile. In other words, foam layer 1004 resists downward force at an exponential force. Foam layer 1004 may provide exponential resistance across the entire layer such that force applied against an edge of keycap 1002 may be subject to the same amount of resistance from foam layer 1004 as when force is applied against a center of keycap 1002. The details of such a force profile is discussed further herein with respect to FIG. 12. Foam layer 1104 may be disposed on a sensor layer 1006, such as sensor layer 602 discussed herein. Sensor layer 1006 may allow foam key 1000 to effectuate a key press when depressed.

In embodiments, the force profile of a collapsible key, such as collapsible key 700, is similar to the force profile of mechanical key 900. In contrast, the force profile of collapsible key 700 is not similar to the force profile of foam key 1000. A comparison of these force profiles are discussed further herein.

F. Force Profile of the Various Keys

Figure 11:
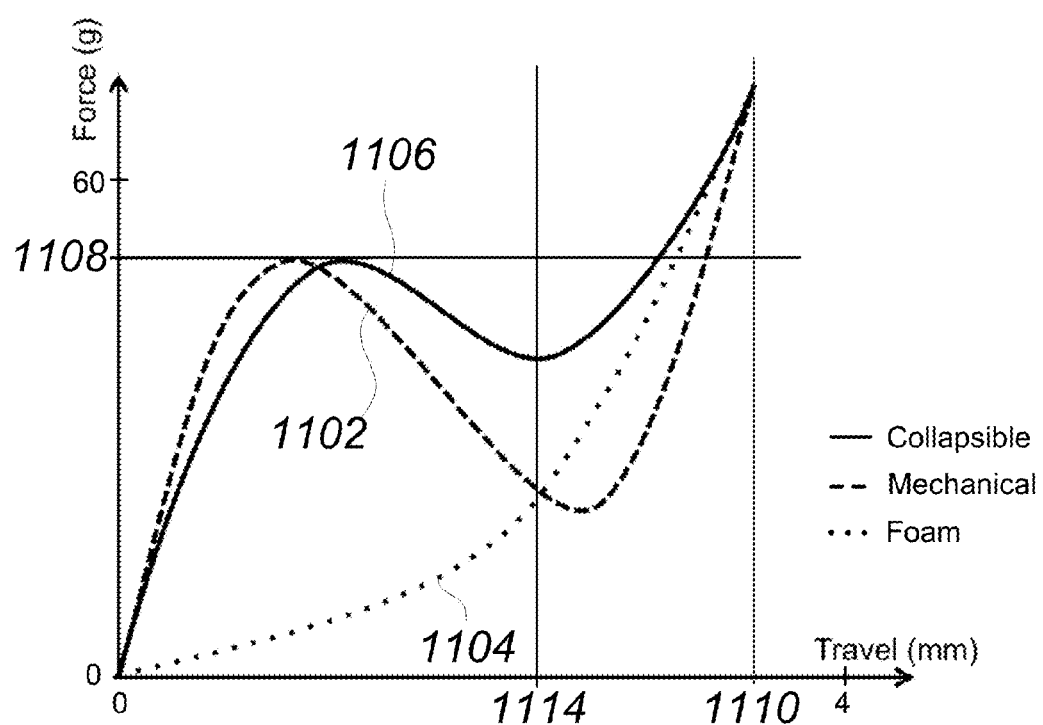
FIG. 11 is a line chart illustrating various force profiles of input devices, according to embodiments of the present invention.

FIG. 11 is a graphical chart illustrating three different force profile curves: a mechanical key curve 1102, a foam key curve 1104, and a collapsible layer key curve 1106. The three curves are plotted onto a single force profile chart for ease of reference and comparison. The force profile chart has an X axis representing distance traveled that increases from left to right, and a Y axis representing amount of force resisting against depression of a key that increases from bottom to top. Although FIG. 11 illustrates axis Y as increasing from 0 to 60 gf and the X axis as increasing from 0 to 4 mm, other embodiments can have different ranges of values.

Mechanical key curve 1102 may represent a force profile for a mechanical key, e.g., mechanical key 900 of FIG. 9, that is substantially similar to an ideal S-curve profile that has great comfort and feel. As shown, mechanical key curve 1102 has an initial steep slope that rapidly approaches a threshold force 1108. Threshold force 1108 may represent an amount of force at which the mechanical key depresses. The initial steep slope indicates that the mechanical key strongly resists key travel because a little distance is traveled as greater force is applied. Once the amount of force reaches threshold force 1108, the mechanical key may depress, i.e., decrease the amount of force resisting the key press, as indicated by the decreasing slope of mechanical key curve 1102. This may result in a feeling as though the key is actually collapsing and effectuating a key press. Thereafter, the mechanical key curve 1102 may begin to resist downward application of force and thus curve back upward. This may be because the key is near the end of its traveling limit 1110, which is a point at which the key is completely depressed and cannot travel any further. When the traveling limit 1110 is reached, the key cannot travel anymore and the curve stops traveling to the right. The dual-changing, i.e., increasing-decreasing-increasing trend, is indicative of the S-curve profile that indicates when a key has good comfort and feel when used.

Foam key curve 1104 may represent a force profile for a foam key, e.g., foam key 1000 of FIG. 10, that has subpar comfort and feel. Foam key curve 1104 may be a force profile for keys that have a compliant foam layer, which is utilized by some conventional compact keyboards. As shown, foam key curve drastically travels a great distance upon application of relatively low force. Thus, the foam key does not sufficiently resist applied downward force, indicating that the foam key is easily depressed and may feel weak. The foam key may begin to sufficiently resists applied downward force when the key travels to a point near its traveling limit 1110, as shown by the change to a more steeply sloped curve.

Collapsible key curve 1106 may represent a force profile for a collapsible key, e.g., collapsible key 700 of FIG. 7, utilizing a collapsible layer, such as collapsible layer 614 of FIG. 6, according to embodiments of the present invention. In contrast to foam key curve 1104, but in comparison with mechanical key curve 1102, collapsible key curve 1106 may have a dual-changing force profile. As shown, collapsible key curve 1106 may steeply increase to threshold force 1108 when the collapsible layer is resisting downward force (see FIG. 8A). Thereafter, collapsible key curve 1106 may decrease after reaching threshold force 1108 when the collapsible layer buckles (see FIG. 8B). Collapsible key curve 1106 may then increase until its traveling limit 1110 is reached when the collapsible layer cannot collapse any further (see FIG. 8B). Such increasing, decreasing, and increasing force profile of collapsible key curve 1106 gives the collapsible key curve 1106 good comfort and feel during use. Therefore the thin profile of collapsible layer 614 minimizes keyboard thickness while achieving good comfort and feel during use.

According to embodiments of the present invention, sensor layer 602 and collapsible layer 614 are designed with one another in mind such that the activation force of sensor layer 602 is in tune with the force profile of collapsible layer 614. For instance, in embodiments, the activation force of sensor layer 602 may be substantially similar, if not equal to, threshold force 1108 of collapsible key curve 614. That way, when a user depresses a key on collapsible layer 614, once the key depresses after being subject to threshold force 1108, sensor layer 602 may simultaneously effectuate a key press. Tuning the activation force to the force profile of a key utilizing collapsible layer 614 provides a cohesive feel when the key is pressed, thereby preserving the good comfort and feel of the compressible key.

In embodiments, sensor layer 602 may effectuate a key press simultaneously with the collapse of collapsible layer 614. As shown in FIG. 11, vertical line 1114 may represent the location of sensor layer 602. At the end of the collapse of collapsible layer 614, force may be applied to sensor layer 602 as collapsible layer 614 presses upon sensor layer 602. In embodiments, the downward force pressing upon collapsible layer 614 may be equal to, if not greater, than the activation force as the activation force is equal to threshold force 1108. Accordingly, the downward force may apply activation force against sensor layer 602 and effectuate a key press. The simultaneous effectuate of a key press and collapse of collapsible layer 614 gives the user a sense of one cohesive key press event, instead of two disjointed events.

IV. Method of Forming an Input Device

Figure 12:
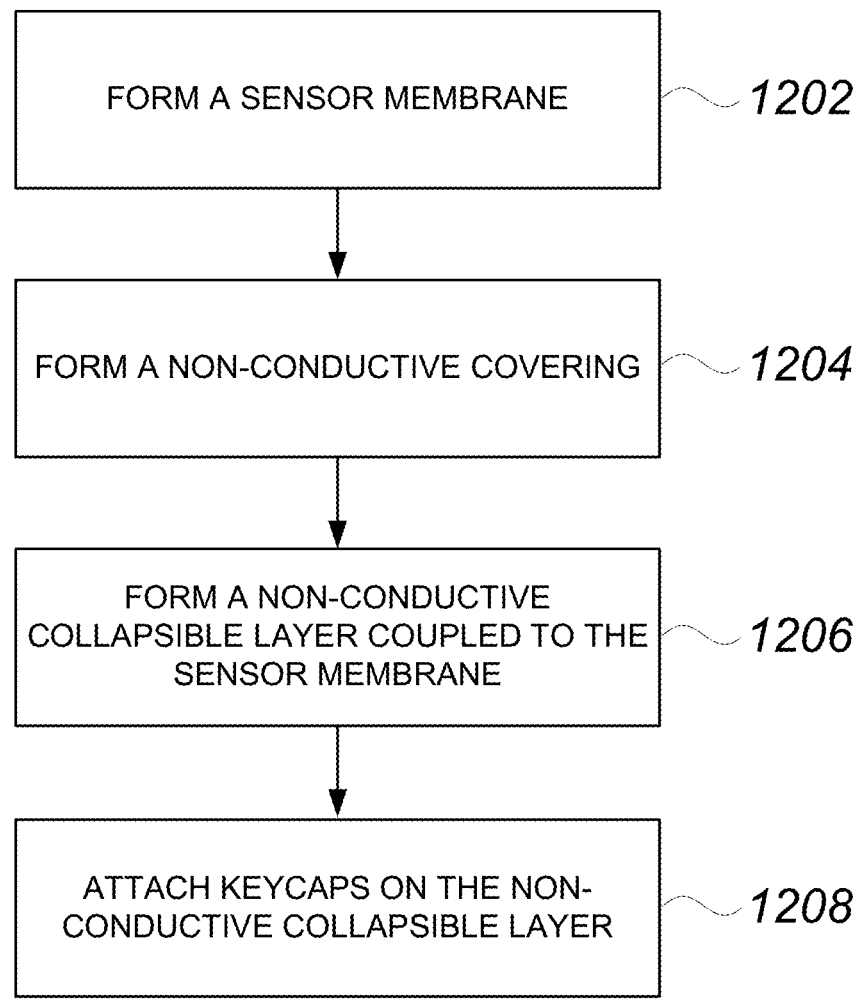
FIG. 12 is a flow chart illustrating a method of forming an input device, according to embodiments of the present invention.

FIG. 12 is a flow chart illustrating a method of forming an input device, such as a solid state keyboard having collapsible keys, according to embodiments of the present invention. At block 1202, a sensor layer, such as sensor layer 602 of FIG. 6, may be formed. In embodiments, the sensor layer is a sensor membrane that includes a first conductive contact layer, a second conductive contact layer, and a non-conductive spacer layer disposed between the first and second contact layers.

In certain embodiments, the spacer layer may be formed on top of the first contact layer. The spacer layer may have a spacer thickness and may include an opening such that the first and second contact layer are separated by empty space. The opening may be formed in the spacer layer following formation of the spacer layer. The second contact layer may be formed on top of the spacer layer. In embodiments, the second layer may be formed such that the first and second contact layers connect within the opening in response to an activation force that pushes the first and second contact layers together.

At block 1204, a covering, such as covering 612 of FIG. 6, may be formed around the sensor layer. In embodiments, the covering may encapsulate the sensor layer such that the covering covers the entire sensor layer. In other embodiments, the covering may cover a portion of the sensor layer. Thereafter, at block 1206, a non-conductive collapsible layer, such as collapsible layer 614 of FIG. 6, may be formed. The collapsible layer may be configured to collapse in response to a collapsing force that is substantially equal to the activation force such that both the collapsible layer collapses and the first and second conductive layers connect with one another in response to the activation force.

In some embodiments, keycaps may then be formed on the non-conductive collapsible layer at block 1208. The keycaps may be attached onto non-conductive collapsible layer by any suitable method. For instance, keycaps may be adhered onto the non-conductive collapsible layer with an adhesive such as epoxy. The keycaps may also be formed of polyurethane hardened on fabric. Other techniques may be used to attach keycaps to the collapsible layer. For instance, keycaps may be mechanically fastened to the collapsible layer. In some embodiments, keycaps may be clipped or screwed onto the collapsible layer.

V. Electrical Component Integration

Using the thin layers results in a solid state keyboard that has an overall thickness that is substantially thinner than typical mechanical keyboards. To maintain such low thicknesses, electrical components 1302, such as control circuit component 210, memory array 220, power management component 230, and communication system component 240 discussed herein with respect to FIG. 2, may need to be integrated into inner component 400 in a particular way to maintain the low thickness.

Figure 13:
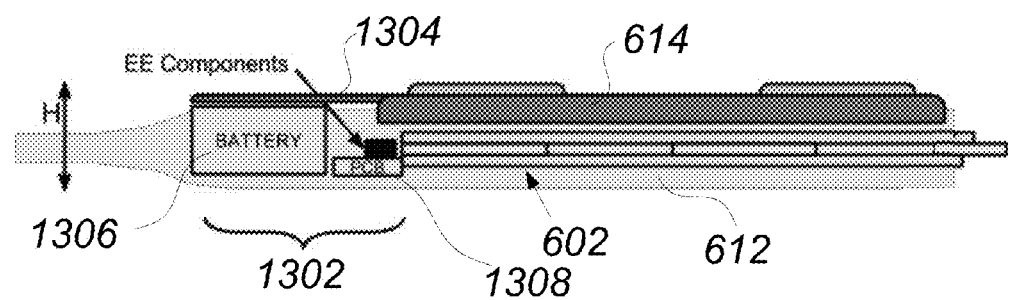
FIG. 13 is a simplified diagram of a cross-sectional view of an input device with electrical components, according to embodiments of the present invention.

FIG. 13 illustrates an exemplary arrangement for the electrical components. As shown, electrical components 1302 may be disposed in covering 612 such that covering 612 may protect electrical components 1302 from dust and debris. In embodiments, electrical components 1302 may include any of the components discussed herein with respect to FIG. 2. For instance, electrical components 1302 may include a battery 1306. Battery 1306 may be a part of a power management components, such as power management component 230 discussed in FIG. 2. Additionally, electrical components 1302 may include a printed circuit board (PCB) 1308. PCB 1308 may be part of a control circuit, such as control circuit component 210 discussed in FIG. 2. PCB 1308 may include processors and/or microcontrollers that are configured to generate input signals according to which key is pressed. The input signals may be any signals that correspond to respective keys of a keyboard, such as alphanumeric signals, etc. Collapsible layer 614 may include an extension 1304 that laterally extends to cover electrical components 1302. In embodiments, extension 1304 may protect electrical components 1302 from physical stress that may damage electrical components 1302.

Figure 14:
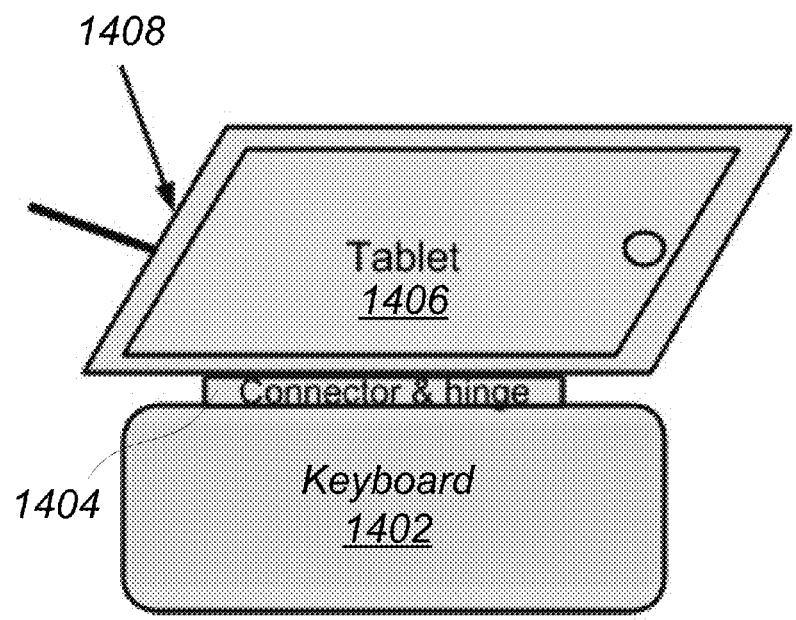
FIG. 14 is a simplified diagram of a perspective view of an input device with electrical components incorporated in a protective cover, according to embodiments of the present invention.

Although electrical components 1302 may be disposed in covering 612, embodiments are not so limited. For instance, electrical components (not shown) may be disposed in a rear protection 1408 for a tablet computer as shown in FIG. 14. The rear protection 1408 may be formed of a solid shell to absorb physical stresses, such as the physical stresses associated with dropping the tablet on the floor. By incorporating the electrical components into rear protection 1408, the size of keyboard 1402, such as a solid state keyboard according to embodiments herein, may not be affected by the size of the electrical components. Thus, keyboard 1402 may maintain its low profile. In such embodiments, a connector/hinge 1404 may be implemented to couple keyboard 1402 with rear protection 1408.

Maintaining the low profile of keyboard 1402 maximizes portability. Conventional portable keyboards utilizing solid state technology suffer from poor comfort and feel. However, embodiments discussed herein utilize a collapsible layer having vertical columns to create an S-curve profile. The collapsible layer may be tuned with the sensor layer to effectuate a key press seamlessly with the collapse of the collapsible layer.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. For example, although certain embodiments have been described with respect to particular process flows and steps, it should be apparent to those skilled in the art that the scope of the present invention is not strictly limited to the described flows and steps. Steps described as sequential may be executed in parallel, order of steps may be varied, and steps may be modified, combined, added, or omitted. As another example, although certain embodiments have been described using a particular combination of hardware and software, it should be recognized that other combinations of hardware and software are possible, and that specific operations described as being implemented in software can also be implemented in hardware and vice versa.

The specification and drawings are, accordingly, to be regarded in an illustrative rather than restrictive sense. Other arrangements, embodiments, implementations and equivalents will be evident to those skilled in the art and may be employed without departing from the spirit and scope of the invention as set forth in the following claims.

What is claimed is:

1. An input device, comprising:
  a sensor layer to effectuate a key press upon application of an activation force; and
  a collapsible layer coupled to the sensor layer, the collapsible layer to collapse in response to receiving a collapsing force that is substantially equal to the activation force, such that both the collapsible layer collapses and the sensor layer effectuates the key press in response to the application of the collapsing force,
  wherein the collapsible layer includes a plurality of vertical columns comprised of continuous fibers knitted into a three-dimensional spacer fabric,
  wherein the vertical columns resist collapse under application of force less than the collapsing force and that collapse upon themselves under application of force equal to or greater than the collapsing force, and
  wherein the applied force is greater than zero.

2. The input device of claim 1 wherein the collapsible layer has a non-linear force profile.

3. The input device of claim 2 wherein the non-linear force profile follows an S-curve profile.

4. The input device of claim 1 wherein a spacer stiffness determines the activation force required to effectuate the key press.

5. The input device of claim 1 wherein the continuous fiber comprises fibers of natural or synthetic origin and consist of a mono- or poly-filament.

6. The input device of claim 1 wherein the sensor layer comprises a sensor membrane, the sensor membrane comprising:
  a first conductive contact layer;
  a second conductive contact layer; and
  a non-conductive spacer layer disposed between the first and second conductive contact layers,
  wherein the spacer layer has a spacer thickness,
  wherein the spacer layer includes an opening such that the first and second contact layers are separated by empty space within the opening, and
  wherein the first and second conductive contact layers make contact within the opening in response to an activation force that pushes the first and second conductive contact layers together.

7. The input device of claim 6 further comprising a keycap coupled to the collapsible layer and directly above the opening of the spacer layer.

8. The input device of claim 6 further comprising a filler material disposed in the openings of the spacer layer to tailor the activation force required to push the first and second conductive contact layers together.

9. The input device of claim 8 wherein the filler material is a resistive material.

10. The input device of claim 6 wherein the first conductive contact layer and the second conductive contact layer comprise bottom and top conductive combs, respectively.

11. The input device of claim 10 wherein the bottom conductive comb is arranged substantially perpendicular to the top conductive comb.

12. The input device of claim 1 further comprising a non-conductive covering, wherein a portion of the non-conductive covering is disposed between the collapsible layer and the sensor layer.

13. A method of forming an input device comprising:
  forming a sensor layer configured to effectuate a key press upon application of an activation force; and
  forming a collapsible layer coupled to the sensor layer, the collapsible layer configured to collapse in response to a collapsing force that is substantially equal to the activation force, such that both the collapsible layer collapses and the sensor layer effectuates the key press in response to application of the collapsing force,
  wherein the collapsible layer includes a plurality of vertical columns comprised of continuous fibers knitted into a three-dimensional spacer fabric, wherein the vertical columns resist collapse under application of force less than the collapsing force and that collapse upon themselves under application of force equal to or greater than the collapsing force, and wherein the applied force is greater than zero.

14. The method of claim 13 further comprising forming a non-conductive covering, wherein a portion of the non-conductive covering is disposed between the collapsible layer and the sensor layer.

15. A system comprising:
a processor; and
an input device coupled to the processor, the input device comprising:
a sensor layer to effectuate a key press upon application of an activation force; and
a collapsible layer coupled to the sensor layer, the collapsible layer to collapse in response to a collapsing force that is substantially equal to the activation force, such that both the collapsible layer collapses and the sensor layer effectuates the key press in response to the application of the collapsing force, wherein the collapsible layer includes a plurality of vertical columns comprised of continuous fibers knitted into a three-dimensional spacer fabric, wherein the vertical columns resist collapse under application of force less than the collapsing force and that collapse upon themselves under application of force equal to or greater than the collapsing force, and wherein the applied force is greater than zero.

16. The computer system of claim 15 wherein the collapsible layer has a non-linear force profile.

17. The computer system of claim 16 wherein the non-linear force profile follows an S-curve profile.

18. The computer system of claim 15 wherein a spacer stiffness determines the activation force required to effectuate the key press.

* * * * *